United States Patent [19]
Méry et al.

[11] Patent Number: 4,576,255
[45] Date of Patent: Mar. 18, 1986

[54] MULTI-DISC BRAKES

[75] Inventors: Jean-Claude Méry, Pavillons sous Bois; Jean-Jacques Carré, Le Raincy; Alain Thioux, Chennevières, all of France

[73] Assignee: Societe Anonyme D.B.A., Paris, France

[21] Appl. No.: 622,916

[22] Filed: Jun. 21, 1984

[30] Foreign Application Priority Data

Jun. 30, 1983 [FR] France ................................ 83 10918

[51] Int. Cl.[4] ............................................ F16D 55/36
[52] U.S. Cl. ................................ 188/71.5; 188/73.37; 464/74
[58] Field of Search ........... 188/218 XL, 218 A, 71.5, 188/71.1, 73.37; 192/70.17, 70.2, 106.1; 464/46, 74, 83, 180

[56] References Cited

U.S. PATENT DOCUMENTS

| | | | |
|---|---|---|---|
| 2,397,642 | 4/1946 | Blazek et al. | 192/68 |
| 2,610,719 | 9/1952 | Hornbostel | 188/218 X |
| 3,245,508 | 4/1966 | Livezey | 192/70.17 |
| 3,575,014 | 4/1971 | Wright | 464/74 |
| 3,616,877 | 11/1971 | Collins | 188/73.45 |
| 3,631,953 | 1/1972 | Snoy | 188/71.5 X |
| 3,645,114 | 2/1972 | Shepherd | 464/83 X |
| 3,836,201 | 9/1974 | Stimson et al. | 192/70.17 X |
| 4,393,963 | 7/1983 | Oltmanns et al. | 188/73.45 |
| 4,474,276 | 10/1984 | Loizeau | 192/106.1 |

FOREIGN PATENT DOCUMENTS

| | | |
|---|---|---|
| 0049179 | 4/1982 | European Pat. Off. . |
| 1205345 | 11/1965 | Fed. Rep. of Germany . |
| 0035468 | 2/1979 | Fed. Rep. of Germany ... 188/218 X |
| 3050284 | 10/1982 | Fed. Rep. of Germany . |
| 1374262 | 8/1964 | France . |
| 0046124 | 4/1981 | Japan ............................. 188/218 X |
| 1087988 | 10/1967 | United Kingdom . |
| 2049845 | 12/1980 | United Kingdom . |
| 718644 | 2/1980 | U.S.S.R. . |

Primary Examiner—Duane A. Reger
Assistant Examiner—Michael P. Gilday
Attorney, Agent, or Firm—Larry J. Palguta; Ken C. Decker

[57] ABSTRACT

The invention relates to a multi-disc brake comprising a stationary rotary disc (1) and a movable rotary disc (2) which is mounted on a splined sleeve (5) sliding on the hub (3) of axis (14) and with which the disc (1) is solid. An assembly of friction pads (6-9) can interact with the discs (1, 2) under the action of a hydraulic jack (13). To prevent any rattling at the start of each braking operation, elastic blocks (50) are inserted inside housings provided in the system of splines of the sleeve (5) and of the hub (3) and, when expanded, draw the flanks of the splines against one another in working contact during a braking operation.

7 Claims, 4 Drawing Figures

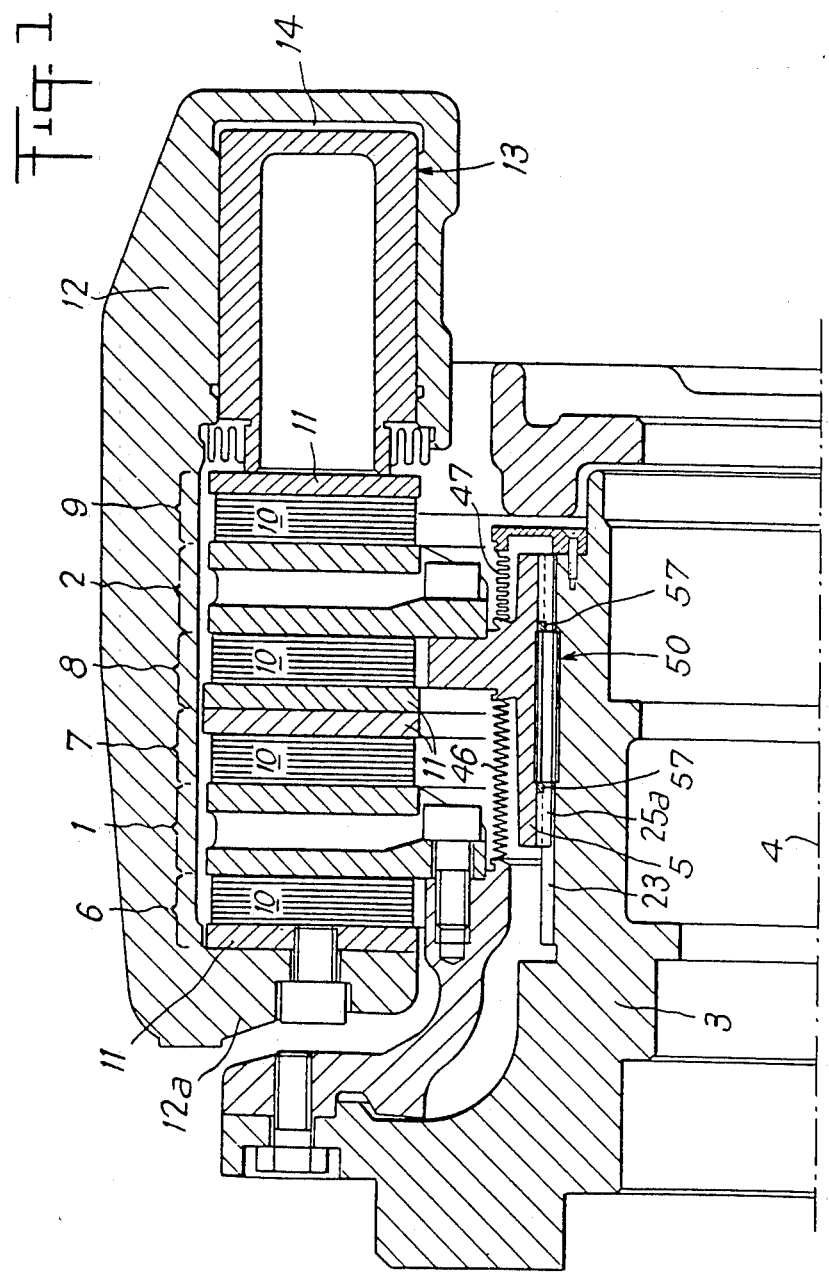

U.S. Patent  Mar. 18, 1986  Sheet 2 of 2  4,576,255
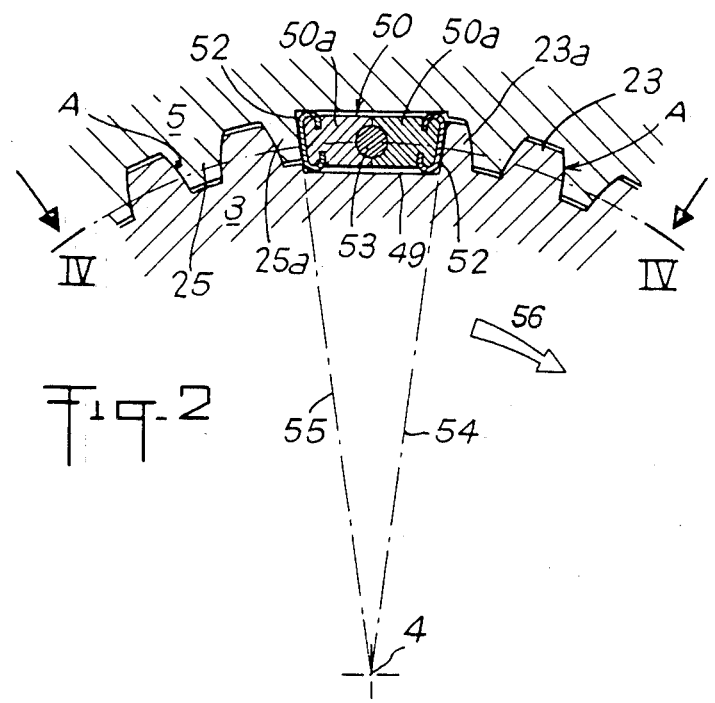
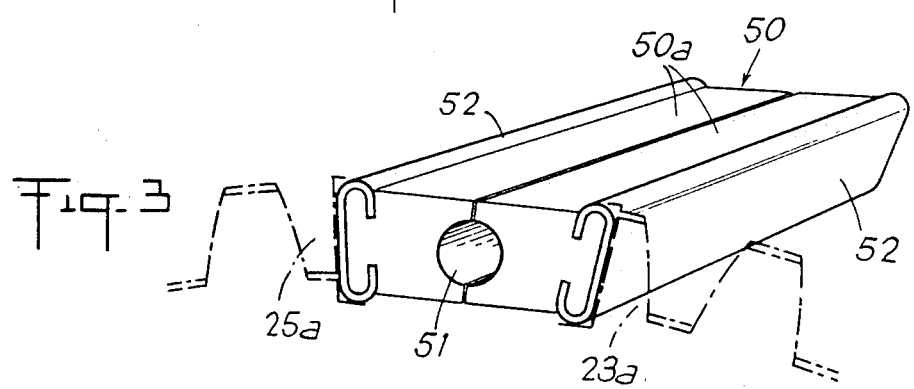
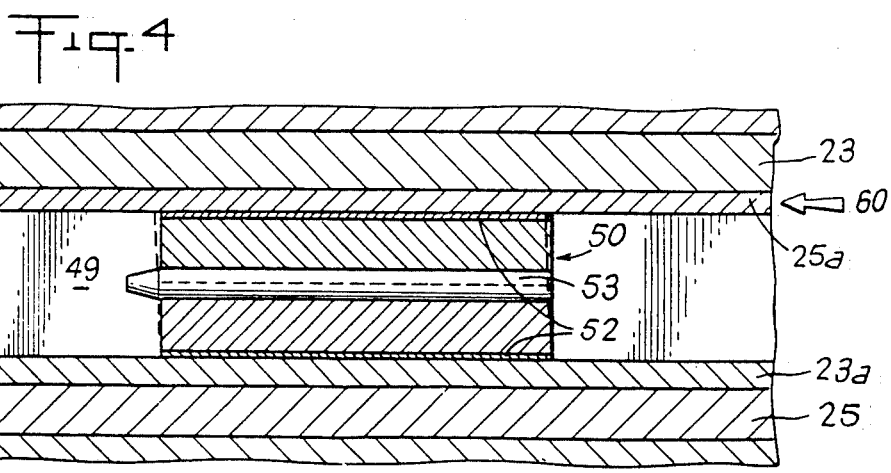

MULTI-DISC BRAKES

The invention relates to a multi-disc brake comprising a first rotary disc solid with a hub which is connected to a component to be braked, rotating in a specific direction of rotation, and a second rotary disc mounted on the hub with a possibility of sliding parallel to the direction of axis of the latter, the axes of the hub and of the said discs coinciding with one another, as well as an assembly of friction pads incorporating friction linings capable of being laid against the faces of the discs by means of an actuating device, such as a hydraulic caliper jack; the second disc is carried by an internally splined sleeve which can slide on an externally splined part of the hub, the mutual engagement of these splines ensuring that the second disc is driven in rotation by the hub.

When such a disc brake starts to be operated, the play which inevitably exists between the splines of the sleeve and of the hub can give rise to rattling caused by the sudden contact made between the flanks of the splines which, during braking, work to transmit the deceleration torque from the second disc to the hub. This phenomenon may be accomplished by vibrations in the splines, thus giving rise to the formation of red powder ($Fe_2O_3$).

To overcome these disadvantages which can have a disastrous effect on the splines, the subject of the invention is a brake of the type indicated, which also incorporates an arrangement generating between the sleeve and the hub a torque which draws them about their common axis in such a direction that it tends to bring up against one another the flanks of the splines of the hub and of the sleeve, via which the braking force is transmitted to the hub. Thus, whenever braking starts, the flanks of the splines made to work when the hub rotates in its normal direction are already in contact with one another, and no rattling can consequently occur.

In a preferred embodiment, the torque-generating arrangement comprises at least one elastic element arranged and expanded in a housing produced by the partial or complete elimination of one or more splines between a spline of the hub and a spline of the sleeve, the elastic element bearing on the latter splines which limit the said housing and tending to move them apart from one another.

Advantageously the two-sided bearing contact of the elastic element is made on radial plane surfaces obtained as a result of the partial elimination of the splines limiting the housing, and the latter can result, in a very simple way, from eliminating on the sleeve as on the hub one spline plus a fraction of a spline, this fraction being, for example, about half a spline. The thickness given to the housing (in a radial direction) can be substantially equal to (or preferably slightly greater than) the height of the splines.

A preferred embodiment of the invention is characterized in that the elastic element consists of a block of rubber or similar material, having cross-sectional dimensions approximate to those of the housing receiving it, this block being expanded as a result of the insertion of a pin into a longitudinal inner duct made in it. The resulting prestress generates the abovementioned torque between the sleeve and the hub. The block advantageously has on its lateral bearing faces a covering which assists sliding on the material of the splines and which can consist of a sheet-metal strip attached to each lateral face of the block. The block is preferably formed from two identical half-blocks coupled symmetrically along the central radial plane of the housing, each of them having half of the abovementioned longitudinal duct.

In order to distribute round the axis of the sleeve and of the hub the forces produced by the torque-generating arrangement, it is appropriate for the latter to comprise several elastic elements, such as those described above, which are spaced at regular intervals over the periphery of the sleeve and of the hub and acting in the same direction.

Other characteristics and advantages of the invention will emerge more clearly from the following description of a non-limiting exemplary embodiment with reference to the attached drawings.

FIG. 1 shows, in axial section, a disc brake designed according to the invention.

FIG. 2 shows part of the system of splines which is provided with an elastic block, in section along a plane perpendicular to the axis of the discs.

FIG. 3 shows, in perspective and on a larger scale, the elastic block illustrated in FIG. 2.

FIG. 4 shows a section along the line IV—IV of the article illustrated in FIG. 2.

The multi-disc brake shown in FIG. 1 comprises a first rotary disc 1, called an outer disc, and a second rotary disc 2, called an inner disc, both being mounted on a hub 3, the axis 4 of which coincides with those of the discs 1 and 2. While the disc 1 is solid with the hub 3 and therefore fixed in the direction of the axis 4, the disc 2 can move in this direction, being fastened to an internally splined sleeve 5 which can slide on a splined cylindrical part of the hub 3, round which it is engaged, the sleeve being driven in rotation by the hub as a result of the engagement of its splines 25 with the splines 23 of the hub 3 (FIG. 2).

Each brake disc 1 or 2 interacts with a pair of friction pads 6 and 7 or 8 and 9 which are located on either side of the corresponding brake disc 1 or 2 and which are capable of being laid against the lateral faces of the latter. Each of these friction pads 6, 7, 8 and 9 comprises friction lining 10 and a lining-holding plate 11, each lining 10 interacting with the adjacent face of the corresponding disc 1 or 2.

A caliper 12 is arranged over the brake discs 1, 2 and their friction pads 6, 7, 8 and 9 so as to cover the assembly consisting of the discs and pads. In the inner part of the caliper 13 there is a control motor, such as a hydraulic jack, the piston 14 of which is capable of acting on the lining-holding plate 11 of the inner pad 9 and, as a result of reaction and because of its grooves nose 12a, on the lining-holding plate 11 of the outer pad 6, so as to control the clamping of the assembly consisting of the discs and pads in the direction of the axis 4 and thereby give rise to the braking friction between each lining 10 and the matching disc frame. This action is accompanied by a displacement of the inner disc 2 parallel to the axis 4 as a result of the sliding of the sleeve 5 relative to the hub 3, of which the splines parallel to the axis 4 are protected from the dirt which could soil them by means of flexible bellows 46, 47 of cylindrical shape, which surround the sleeve 5 and the part of the hub on which it slides.

In the splines 23, 25 engaged with one another there are several housings 49, one of which can be seen in FIG. 2. Each of these housings, distributed angularly in a regular manner over the periphery (for example, three of them spaced 120° from one another), is obtained as a result of the elimination by removal of the material of one and a half splines on the hub 3 and on the sliding sleeve 5. The remaining half-splines 23a and 25a, belonging to the hub 3 and to the sleeve 5 respectively, limit the housing 49 laterally by means of faces contained in radial planes 55 and 54 respectively. In a radial direction, the housing 49 has a thickness substantially equal to the height of the splines 23, 25.

Inserted in each of the housings 49 is an elastic block 50 made of rubber or elastomer, having a substantially parallelepipedic general shape, composed of two identical half-blocks 50a and perforated longitudinally by a central duct 51 (FIG. 3) of circular cross-section, intended for receiving a pin 53. Each half-block 50a is provided with a metal strip 52 attached (for example, by adhesion or moulding-on) to its lateral face opposite that having half of the duct 51. The width of the blocks 50 is substantially equal to that of the housings 49, that is to say to the distance separating the plane faces of the half-splines 23a, 25a limiting each housing.

Once a block 50 has been installed in a housing 49, the pin 53, in the form of a pencil and having a diameter a little greater than that of the duct 51, is inserted into its duct 51. A certain expansion is thereby imparted to the block 50, the effect of which is to push away from one another the half-splines 23a, 25a, on which the block 50 bears by means of its lateral strips 52, and thus exert a differential torque on the hub 3 and the sleeve 5, which eliminates the play between these elements in the connection by which the sleeve 5 is driven in rotation by the hub 3.

More specifically, to avoid any risk of rattling at the start of braking, the order of the bearing half-splines 23a, 25a of each block 50 in relation to the direction of rotation 56 of the hub 3 is selected so that the torque which this block exerts between the sleeve 5 and the hub 3 tends to press against one another the flanks A of the splines which function during braking. Consequently, the half-spline downstream of the block 50 in the direction 56 belongs to the sleeve 5 and the half-spline upstream of the said block belongs to the hub 3.

In the longitudinal direction parallel to the axis 4, each block 50 is retained by a pair of stop rings 57 (FIG. 1) solid with the sleeve 5 (or alternatively with the hub 3).

The presence of the elastic blocks 50 provides an additional effect which becomes apparent at the end of each braking operation. During such an operation, the disc 2 and its supporting sleeve 5 are displaced a little way towards the outside according to the arrow 60 (FIG. 4), and, in spite of the low coefficient of friction between the metals of the strips 52 and of the bearing splines 23a, 25a, this causes a shearing deformation in the blocks 50, each of which then assumes the configuration indicated by dashes. The force thus accumulated in the blocks 50 is restored by these at the end of braking and provides an axial return contributing to bringing the disc 2 back into the position of rest.

We claim:

1. A multi-disc brake comprising a first rotary disc fixed to a hub which is connected to a component to be braked, a second rotary disc mounted on the hub and slidable in a direction parallel to an axis of the hub, axes of the hub and discs coinciding with one another to form a common axis, and an assembly of friction pads incorporating friction linings for engaging faces of the discs by means of an actuating device, the second disc carried by an internally splined sleeve slidable on an externally splined part of the hub, mutual engagement of the splines insuring that second disc rotates with the hub, characterized in that the brake includes an elastic element disposed between the sleeve and hub to generate a circumferential preload torque about the common axis and engage flanks of the splines of the hub and sleeve so that braking force is transmitted from the discs to the hub, the elastic element disposed and expanded within a housing formed by elimination of at least one spline between a spline of the hub and a spline of the sleeve, the elastic element comprising a block of resilient material having a lateral width approximating a circumferential width of the housing and expanded circumferentially as a result of insertion of a pin into a longitudinal inner opening extending in the block, the elastic element bearing on adjacent splines which define radial sides of the housing and biasing the adjacent splines circumferentially apart from one another, and the block being formed by two half-blocks coupled symmetrically along a central radial plane of the housing each half-block including half of the longitudinal inner opening receiving the pin.

2. The brake according to claim 1, characterized in that the block exerts the circumferential preload torque in only one circumferential direction.

3. The brake according to claim 2, characterized in that the housing is obtained as a result of elimination of a complete spline and of a fraction of a spline on each of the sleeve and hub.

4. The brake according to claim 3, characterized in that the eliminated fractions of splines comprise about half of each respective spline.

5. The brake according to claim 4, characterized in that the radial height of the housing is substantially equal to the radial height of the splines.

6. The brake according to claim 1, characterized in that the block includes bearing faces each having a covering which assists slidable engagement with the splines.

7. The brake according to claim 6, characterized in that each covering comprises a sheet-metal strip attached to a respective face of the block.

* * * * *